United States Patent
Maeda et al.

(10) Patent No.: US 6,866,376 B2
(45) Date of Patent: Mar. 15, 2005

(54) ACTIVE ENERGY BEAM-CURABLE COMPOSITION, INK CONTAINING THE SAME, AND PRINTER ACCOMMODATING THE SAME INK

(75) Inventors: Minobu Maeda, Konan (JP); Kou Shimada, Nagoya (JP); Masahiro Nishizaki, Iwakura (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 10/234,353

(22) Filed: Sep. 5, 2002

(65) Prior Publication Data

US 2003/0094738 A1 May 22, 2003

(30) Foreign Application Priority Data

Sep. 28, 2001 (JP) ........................................ 2001-299825

(51) Int. Cl.⁷ .................................................. B41J 2/01
(52) U.S. Cl. ........................ 347/100; 347/102; 347/101; 523/160
(58) Field of Search ................................ 347/100, 101, 347/96, 95, 102; 106/31.13, 31.28, 31.27, 31.6, 31.85; 523/160

(56) References Cited

U.S. PATENT DOCUMENTS

| | | |
|---|---|---|
| 3,835,003 A | 9/1974 | Schlesinger |
| 3,942,110 A | 3/1976 | Milkovic |
| 4,058,401 A | 11/1977 | Crivello |
| 4,069,055 A | 1/1978 | Crivello |
| 4,136,102 A | 1/1979 | Crivello |
| 4,139,655 A | 2/1979 | Tsao |
| 4,161,478 A | 7/1979 | Crivello |
| 4,173,551 A | 11/1979 | Crivello |
| 4,175,963 A | 11/1979 | Crivello |
| 4,175,972 A | 11/1979 | Crivello |
| 4,175,973 A | 11/1979 | Crivello |
| 4,197,174 A | 4/1980 | Chang |
| 4,219,654 A | 8/1980 | Crivello |
| 4,234,732 A | 11/1980 | Crivello |
| 4,250,311 A | 2/1981 | Crivello |
| 4,256,828 A | 3/1981 | Smith |
| 4,299,938 A | 11/1981 | Green et al. |
| 4,318,766 A | 3/1982 | Smith |
| 4,339,567 A | 7/1982 | Green et al. |
| 4,374,066 A | 2/1983 | Crivello et al. |
| 4,378,277 A | 3/1983 | Smith |
| 4,387,216 A | 6/1983 | Irving |
| 4,394,403 A | 7/1983 | Smith |

(List continued on next page.)

FOREIGN PATENT DOCUMENTS

| | | |
|---|---|---|
| EP | 1 138 739 A1 | 10/2001 |
| EP | 1 243 629 A1 | 9/2002 |
| EP | 1 357 159 A2 | 10/2003 |

(List continued on next page.)

OTHER PUBLICATIONS

U.S. patent application 10/396,321 to Minobu Maeda et al., filed Mar. 26, 2003.
U.S. patent application 10/234,212 to Minobu Maeda et al., filed Sep. 5, 2002.

Primary Examiner—Manish Shah
(74) Attorney, Agent, or Firm—Oliff & Berridge, PLC

(57) ABSTRACT

An active energy beam-curable composition includes a photo-cationic polymerizable substance; a photo-cationic polymerization initiator; and an oxetane compound such as 3-ethyl-3-hydroxymethyloxetane, di[1-ethyl(3-oxetanyl)] methyl ether, and 3-ethyl-3-(2-ethylhexyloxymethyl) oxetane. Owing to the oxetane compound contained in the composition, it is possible to suppress the occurrence of odor and cloudiness even when the composition is heated after being cured.

15 Claims, 4 Drawing Sheets

U.S. PATENT DOCUMENTS

| | | | |
|---|---|---|---|
| 4,407,759 A | 10/1983 | Crivello | |
| 4,417,061 A | 11/1983 | Crivello | |
| 5,059,266 A | 10/1991 | Yamane et al. | |
| 5,178,996 A | 1/1993 | Kobayashi et al. | |
| 5,302,439 A | 4/1994 | Malhotra et al. | |
| 5,463,084 A | 10/1995 | Crivello et al. | |
| 5,476,752 A | 12/1995 | Noguchi et al. | |
| 5,674,922 A | 10/1997 | Igarashi et al. | |
| 5,681,643 A | 10/1997 | Noguchi et al. | |
| 5,721,020 A * | 2/1998 | Takami et al. | 427/508 |
| 5,750,590 A | 5/1998 | Schaefer et al. | |
| 5,889,084 A | 3/1999 | Roth | |
| 6,092,890 A * | 7/2000 | Wen et al. | 347/101 |
| 6,197,409 B1 | 3/2001 | Bodagger et al. | |
| 6,232,361 B1 * | 5/2001 | Laksin et al. | 106/31.6 |
| 2003/0112307 A1 | 6/2003 | Maeda et al. | |
| 2003/0218269 A1 | 11/2003 | Maeda et al. | |

FOREIGN PATENT DOCUMENTS

| | | | | |
|---|---|---|---|---|
| GB | 1 516 351 | 7/1978 | | |
| GB | 1 516 511 | 7/1978 | | |
| GB | 2 061 280 A | 5/1981 | | |
| JP | 49-17040 | 2/1974 | | |
| JP | 50-151996 | 12/1975 | | |
| JP | 50-151997 | 12/1975 | | |
| JP | 50-158680 | 12/1975 | | |
| JP | 50-158698 | 12/1975 | | |
| JP | 52-30899 | 3/1977 | | |
| JP | A 55-125105 | 9/1980 | | |
| JP | 56-8428 | 1/1981 | | |
| JP | A 56-55420 | 5/1981 | | |
| JP | A 56-149402 | 11/1981 | | |
| JP | A 57-192429 | 11/1982 | | |
| JP | A 60-199025 | 10/1985 | | |
| JP | A 63-51472 | 3/1988 | | |
| JP | A 4-11626 | 1/1992 | | |
| JP | 8-118784 | 5/1996 | | |
| JP | 08143806 | * 6/1996 | | C09D/11/00 |
| JP | A 8-143806 | 6/1996 | | |
| JP | 8-208832 | 8/1996 | | |
| JP | 8-218296 A | 8/1996 | | |
| JP | 8-258372 A | 10/1996 | | |
| JP | 0 844 255 A1 | 5/1998 | | |
| JP | 10-195117 A | 7/1998 | | |
| JP | A 11-140279 | 5/1999 | | |
| JP | 11140279 | * 5/1999 | | C08L/63/00 |
| JP | 11-158254 | 6/1999 | | |
| JP | A 11-246647 | 9/1999 | | |
| JP | 11246647 | * 9/1999 | | C08G/59/40 |
| JP | A 2000-144043 | 5/2000 | | |
| JP | 2000-297149 A | 10/2000 | | |
| JP | A 2001-213044 | 8/2001 | | |
| JP | 2001-323194 | 11/2001 | | |
| JP | A 2002-317139 | 10/2002 | | |
| WO | 00/50245 | 8/2000 | | |

* cited by examiner

ACTIVE ENERGY BEAM-CURABLE COMPOSITION, INK CONTAINING THE SAME, AND PRINTER ACCOMMODATING THE SAME INK

BACKGROUND OF THE INVENTION

1. Field of the Invention

The present invention relates to an active energy beam-curable composition which is quickly cured by irradiation with an active energy beam such as ultraviolet radiation and electron beam, which causes neither odor nor cloudiness even when the cured composition is heated, and which has a low viscosity with good operation performance. The present invention also relates to an ink which contains the energy beam-curable composition, and a printer which is accommodates the ink.

2. Description of the Related Art

The active energy beam curing technique is extremely important in a variety of industries including, for example, wood coating, metal painting, and printing, because of various characteristics including, for example, the quick curing speed, the good operation performance generally brought about by the absence of solvent, and the extremely low amount of required energy. Especially, the photo-cationic polymerization is attractive, because of the sufficient possibility to realize a variety of chemical and physical characteristics by means of polymerization of various monomers. In the photo-cationic polymerization, the polymerization is not inhibited by oxygen. Therefore, it is unnecessary to carry out the polymerization in an inert atmosphere. The photo-cationic polymerization is advantageous in that the polymerization can be performed quickly and completely in the air.

However, the conventional active energy beam-curable composition involves the following problem. That is, when the active energy beam-curable composition is further heated after being subjected to coating and curing on a base material such as wood, metal, and paper, any odor is caused by the volatile component thereof, for example, any uncured remaining monomer.

When the active energy beam-curable composition is used at the inside of an instrument or the like, the following problem also arises. That is, when the active energy beam-curable composition itself undergoes a high temperature, any cloudiness appears in the instrument due to the volatile component of the active energy beam-curable composition.

Taking the handling of the active energy beam-curable composition into consideration, it is desirable that the active energy beam-curable composition itself has a low viscosity before being cured. Therefore, when the active energy beam-curable composition contains a photo-cationic polymerizable substance and a polymerization initiator, a low viscosity polymerizable substance such as vinyl ether is used as a diluent in order to lower the viscosity. However, when the low viscosity polymerizable substance such as vinyl ether is used, the following problem arises. That is, when the cured composition is heated as described above, then the volatilization occurs, and the odor and the cloudiness are caused.

SUMMARY OF THE INVENTION

The present invention has been made in order to solve the problems as described above, an object of which is to provide an active energy beam-curable composition which has a low viscosity with good operation performance, which avoids the appearance of the volatile component even when the active energy beam-curable composition is cured and heated thereafter, and which makes it possible to avoid the occurrence of the odor and the cloudiness, an ink containing the composition, and an ink-jet discharge apparatus with an ink container which accommodates the ink.

According to a first aspect of the present invention, there is provided an active energy beam-curable composition comprising:

a photo-cationic polymerizable substance;

a photo-cationic polymerization initiator; and an oxetane compound.

In the present invention, the active energy beam-curable composition, which comprises the photo-cationic polymerizable substance and the photo-cationic polymerization initiator, contains the oxetane compound. The oxetane compound may be, for example, 3-ethyl-3-hydroxymethyloxetane, 1,4-bis{[(3-ethyl-3-oxetanyl)methoxy]methyl}benzene, di[1-ethyl(3-oxetanyl)]methyl ether, 3-ethyl-3-(2-ethylhexyloxymethyl)oxetane, 3-ethyl-3-(phenoxymethyl)oxetane, 3-ethyl-3-{[3-(triethoxysilyl)propoxy]methyl}oxetane, oxetanyl silsesquioxane, or phenol novolac oxetane. Preferably, the oxetane compound is 3-ethyl-3-hydroxymethyloxetane, di[1-ethyl(3-oxetanyl)]methyl ether, or 3-ethyl-3-(2-ethylhexyloxymethyl)oxetane. It is considered that the oxetane compound as described above is polymerized by the irradiation with the active energy beam (ring-opening polymerization), and the oxetane compound forms a strong bonding state by means of any chemical reaction together with the photo-cationic polymerizable substance. Therefore, even when the composition, which has been cured by the irradiation with the active energy beam, is heated again, then the volatile component, which is any remaining monomer, exists in an extremely small amount, and thus the odor and the cloudiness are scarcely caused. Further, the oxetane compound has a relatively low viscosity. Therefore, it is easy to handle the active energy beam-curable composition.

In view of the prevention of the cloudiness and the odor which would be otherwise caused by the cured composition, the photo-cationic polymerizable substance preferably contains an epoxy resin compound. Especially, an alicyclic epoxy resin compound is preferred, because it enhances the crosslinking degree of the active energy beam-curable composition. Alternatively, the photo-cationic polymerizable substance may be an oxetane compound.

The photo-cationic polymerization initiator may contain an onium salt. When the onium salt is used, then the crosslinking degree of the active energy beam-curable composition is enhanced, and it is possible to more effectively avoid the cloudiness and the odor when the cured composition is heated.

The active energy beam-curable composition may be a color or colorless (transparent) ink, for example, an ink to be preferably used for the ink-jet (or ink discharging) application. In this case, the composition may contain, for example, a coloring agent of a dye or a pigment, an inorganic filler, a surface-treating agent (a surfactant and/or a dispersing agent), a viscosity-adjusting agent, a treating agent, and an ultraviolet radiation-blocking agent, in addition to the photo-cationic polymerizable substance and the polymerization initiator. When the composition is used as the ink for the ink-jet application, the composition is prepared so that the viscosity of the composition upon discharging the ink from an ink jet head (ink discharging head) is 2 cps to 30 cps.

The content of the oxetane compound is preferably about 2% by weight to about 87% by weight, in view of the fact that the occurrence of the odor and the cloudiness is avoided. Further, when the composition is used for an ink head of an ink-jet apparatus (or ink discharging apparatus) which performs ink-molding or ink-curing printing, the content of the oxetane compound is preferably about 20% by weight to about 77% by weight. When the composition is used for the ink to be preferably used for the ink-jet application, the content of the oxetane compound affects the viscosity of the composition. Therefore, the content is preferably adjusted within a range in which the viscosity of the composition upon discharging the ink from an ink jet head is 2 cps to 30 cps.

According to a second aspect of the present invention, there is provided an ink discharging apparatus comprising:

an ink discharging head which discharges an ink;

an ink tank which stores the ink to be supplied to the ink discharging head; and a light source which is used to cure the discharged ink, wherein the ink comprises:

a photo-cationic polymerizable substance;

a photo-cationic polymerization initiator; and an oxetane compound.

In the ink discharging apparatus of the present invention, the ink, which has been discharged by the ink discharging head, for example, onto the impermeable surface of those of wood, metal or the like, is cured with the light source such as the ultraviolet radiation. The ink contains the photo-cationic polymerizable substance, the photo-cationic polymerization initiator, and the oxetane compound. Therefore, the ink has a preferred viscosity to be discharged from the ink discharging head. Even when the cured ink is heated, neither odor nor cloudiness is caused. The ink discharging apparatus may be provided, for example, as a dispenser, a coater, and a printer. The ink tank may be an ink container fixedly provided in the apparatus or an ink cartridge which is replaceable.

BRIEF DESCRIPTION OF THE DRAWINGS

An embodiment of the invention will be described in detail with reference to the following figures wherein.

DESCRIPTION OF THE PREFERRED EMBODIMENTS

Figure 1A:
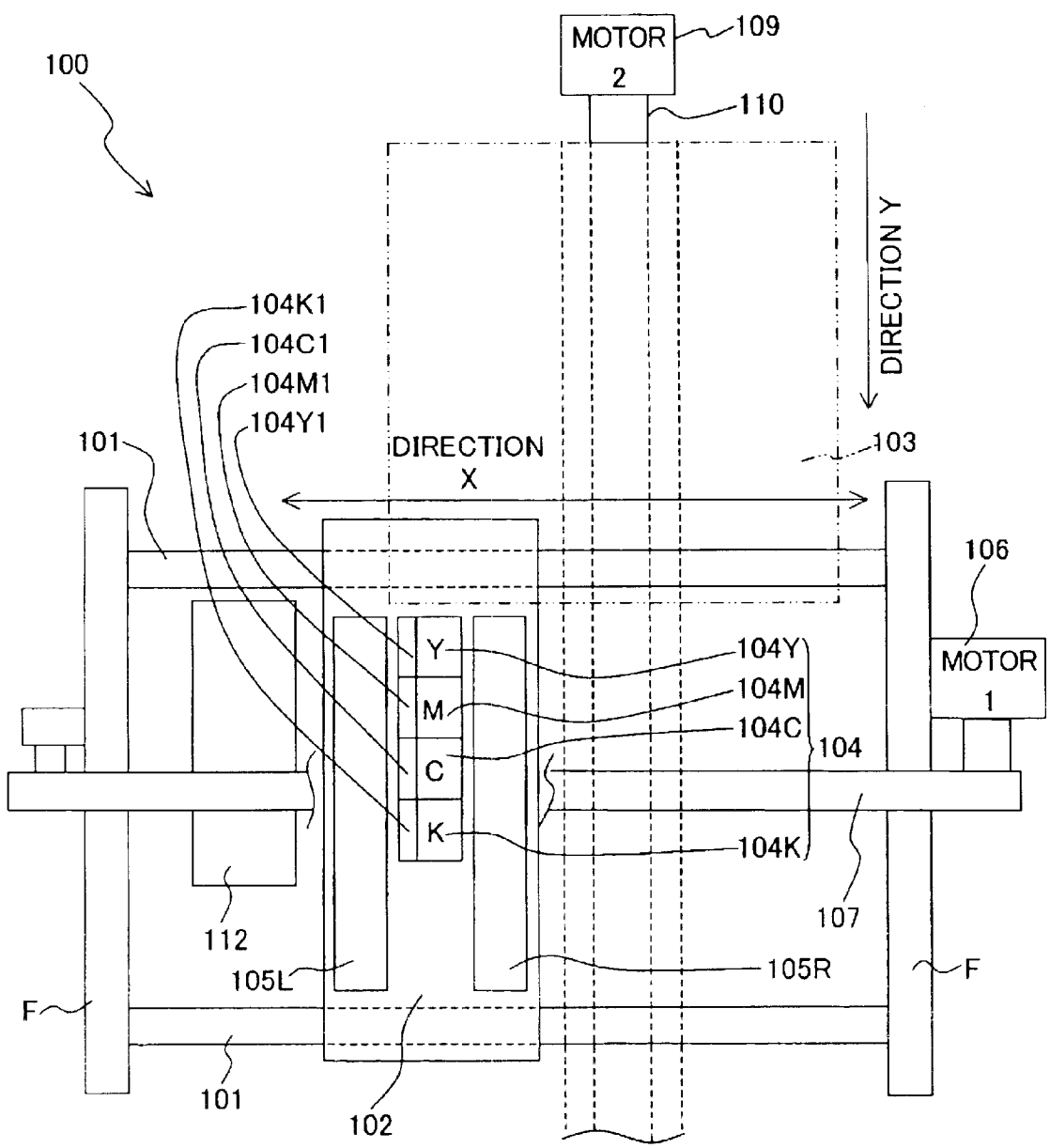
FIG. 1A is a plan view of a color ink jet printer of a first embodiment of the invention.

The present invention will be explained in detail below. At first, explanation will be made for the substances to be used for the present invention.

(A) Photo-Cationic Polymerizable Substance

The photo-cationic polymerizable substance (A) (hereinafter referred to as "component (A)" as well) is an organic compound which causes the polymerization reaction and/or the crosslinking reaction by being irradiated with light in the presence of the cationic photopolymerization initiator. The photo-cationic polymerizable substance (A) includes, for example, epoxy compound, oxolane compound, cyclic acetal compound, cyclic lactone compound, thiirane compound, thietane compound, spiro ortho ester compound as reaction product of epoxy compound and lactone, cyclic ether compound, and cyclic thioether compound.

The alicyclic epoxy resin compound may include, for example, 3,4-epoxycyclohexylmethyl-3',4'-epoxycyclohexane carboxylate, 2-(3,4-epoxycyclohexyl-5,5-spiro-3,4-epoxy)cyclohexane-meta-dioxane, bis(3,4-epoxycyclohexylmethyl)adipate, vinylcyclohexene oxide, 4-vinylepoxycyclohexane, bis(3,4-epoxy-6-methylcyclohexylmethyl)adipate, 3,4-epoxy-6-methylcyclohexyl-3',4'-epoxy-6'-methylcyclohexane carboxylate, methylenebis(3,4-epoxycyclohexane), dicyclopentadiene diepoxide, di(3,4-epoxycyclohexylmethyl) ether of ethylene glycol, ethylenebis(3,4-epoxycyclohexane carboxylate), epoxydized tetrabenzyl alcohol, and lactone modified 3,4-epoxycyclohexylmethyl-3',4'-epoxycyclohexane carboxylate.

The cationic polymerizable substance, which is especially preferred as the alicyclic epoxy resin compound, is the epoxy compound having two or more alicyclic epoxy groups in one molecule, including, for example, 3,4-epoxycyclohexylmethyl-3', 4'-epoxycyclohexane carboxylate and bis(3,4-epoxycyclohexylmethyl)adipate.

Commercially available products of the cationic polymerizable substance, which are preferably usable as the alicyclic epoxy resin compound, may include, for example, UVR-6100, UVR-6105, UVR-6110, and UVR-6128 (all produced by Union Carbide Corporation), Celloxide 2021, Celloxide 2021P, and Celloxide 2021A (all produced by Daicel Chemical Industries, Ltd.), and KRM-2100 and KRM-2199 (both produced by Asahi Denka Co., Ltd.).

It has been confirmed that the use of the epoxy resin compound makes it possible to further avoid the appearance of the volatile component and further avoid the occurrence of the odor and the cloudiness, even when the active energy beam-curable composition of the present invention is heated after being cured.

Especially, when the alicyclic epoxy resin compound is used, it is possible to enhance the crosslinking degree when the active energy beam-curable composition of the present invention is heated after being cured. The occurrence of the odor and the cloudiness has been successfully avoided.

It is preferable that the photo-cationic polymerizable substance other than the vinyl ether compound is used as the photo-cationic polymerizable substance to be used for the present invention, for the following reason. That is, if the vinyl ether compound is contained in the composition, when the cured composition is heated, then acetaldehyde and crotonaldehyde are volatilized, and they cause the odor and the cloudiness. However, it is allowable that the photo-cationic polymerizable substance other than the vinyl ether compound is used as a major component of the photo-cationic polymerizable substance, and a minute amount of the vinyl ether compound is contained within a range in which no harmful influence is exerted on the odor and the cloudiness.

(B) Photo-Cationic Polymerization Initiator

The photo-cationic polymerization initiator (B) (hereinafter referred to as "component (B)" as well), which constitutes the active energy beam-curable composition of the present invention, is the compound capable of releasing the substance to initiate the cationic polymerization by receiving the energy beam such as light. Especially preferred compounds may include the onium salt having the structure represented by the general formula (1). The onium salt is the compound which releases Lewis acid when it receives light.

$$[R^1_a R^2_b R^3_c R^4_d Z]^{+m}[MX_{n+m}]^{-m} \qquad \text{General Formula (1)}$$

In the formula, the cation is onium. Z is S, Se, Te, P, As, Sb, Bi, O, I, Br, Cl, or N≡N. $R^1$, $R^2$, $R^3$, and $R^4$ are identical or different organic groups. a, b, c, and d are integers of 0 to 3 respectively. (a+b+c+d) is equal to the valency number of Z. M represents metalloid or metal to constitute the central atom of the halide complex, including, for example, B, P, As, Sb, Fe, Sn, Bi, Al, Ca, In, Ti, Zn, Sc, V, Cr, Mn, and Co. X represents halogen atom. m represents the net charge of the halide complex ion. n represents the number of atoms in the halide complex ion. Specifically, the anion $(MX_{n+m})$ in the general formula (1) described above includes, for example, tetrafluoroborate $(BF_4^-)$, hexafluorophosphate $(PF_6^-)$, hexafluoroantimonate $(SbF_6^-)$, hexafluoroarsenate $(AsF_6^-)$, and hexachloroantimonate $(SbCl_6^-)$.

Further, it is possible to use the onium salt having the anion represented by the general formula $[MX_n(OH)^-]$. Furthermore, it is also possible to use the onium salt having another anion such as perchlorate ion $(ClO_4^-)$, trifluoromethanesulfonate ion $(CF_3SO_3^-)$, fluorosulfonate ion $(FSO_3^-)$, toluenesulfonate ion, trinitrobenzenesulfonate anion, and trinitrotoluenesulfonate anion.

Among the onium salts as described above, the onium salt, which is especially effective as the component (B), is the aromatic onium salt. Especially, it is preferable to use, for example, aromatic halonium salt described, for example, in Japanese Patent Application Laid-open No. 50-151996 corresponding to England Patent No. 1516351 and Japanese Patent Application Laid-open No. 50-158680 corresponding to U.S. Pat. No. 4,394,403; VIA group aromatic onium salt described, for example, in Japanese Patent Application Laid-open No. 50-151997 corresponding to England Patent No. 1516511, Japanese Patent Application Laid-open No. 52-30899 corresponding to U.S. Pat. No. 4,256,828, Japanese Patent Application Laid-open No. 56-55420 corresponding to England Patent No. 2061280, and Japanese Patent Application Laid-open No. 55-125105 corresponding to U.S. Pat. No. 4,197,174; VA group aromatic onium salt described, for example, in Japanese Patent Application Laid-open No. 50-158698 corresponding to U.S. Pat. No. 4,069,055; oxosulfoxonium salt described, for example, in Japanese Patent Application Laid-open No. 56-8428, Japanese Patent Application Laid-open No. 56-149402, and Japanese Patent Application Laid-open No. 57-192429 corresponding to U.S. Pat. No. 4,387,216; aromatic diazonium salt described, for example, in Japanese Patent Application Laid-open No. 49-17040; and thiopyrylium salt described in U.S. Pat. No. 4,139,655. It is also possible to refer, for example, to initiators based on aluminum complex/photolysis silicon compound and iron/allene complex.

Commercially available products of the cationic photopolymerization initiator, which are preferably usable as the component (B), may include, for example, UVI-6950, UVI-6970, UVI-6974, and UVI-6990 (all produced by Union Carbide Corporation); ADEKA Optomer SP-150, SP-151, SP-170, and SP-171 (all produced by Asahi Denka Co., Ltd.); Irgacure 261 (produced by Ciba-Geigy Corporation); CI-2481, CI-2624, CI-2639, and CI-2064 (all produced by NIPPON SODA CO., LTD.); CD-1010, CD-1011, and CD-1012 (all produced by Sartomer Company); and DTS-102, DTS-103, NAT-103, NDS-103, TPS-103, MDS-103, MPI-103, and BBI-103 (all produced by Midori Kagaku Co., Ltd.). Among the commercially available products described above, UVI-6970, UVI-6974, ADEKA Optomer SP-170, SP-171, CD-1012, and MPI-103 are especially preferred, because it is possible to allow the resin composition containing each of them to express the high curing sensitivity.

When the onium salt is contained, then it is possible to enhance the crosslinking degree when the active energy beam-curable composition of the present invention is heated after being cured, and the occurrence of the odor and the cloudiness has been successfully avoided.

(C) Oxetane Compound

The oxetane compound (C) (hereinafter referred to as "component (C)" as well), which constitutes the active energy beam-curable composition of the present invention, is the compound having one or more oxetane ring or oxetane rings represented by the following formula (1).

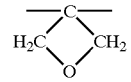

(1)

The compound causes the polymerization reaction and/or the crosslinking reaction by being irradiated with light in the presence of the cationic polymerizable photopolymerization initiator.

Various compounds may be used as the compound having the oxetane ring as described above, provided that the compound has one or more oxetane ring or oxetane rings. The compound will be exemplified below.

The compound, which has one oxetane ring, includes, for example, compounds represented by the following general formula (2).

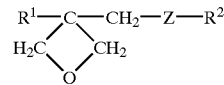

(2)

In the general formula (2), Z represents oxygen atom or sulfur atom. $R^1$ represents hydrogen atom; fluorine atom; alkyl group having a number of carbon atom or carbon atoms of 1 to 6 such as methyl group, ethyl group, propyl group, and butyl group; fluoroalkyl group having a number of carbon atom or carbon atoms of 1 to 6 such as trifluoromethyl group, perfluoroethyl group, and perfluoropropyl group; aryl group having a number of carbon atoms of 6 to 18 such as phenyl group and naphthyl group; furyl group; and thienyl group. $R^2$ represents, for example, hydrogen atom; alkyl group having a number of carbon atom or carbon atoms of 1 to 6 such as methyl group, ethyl group, propyl group, and butyl group; alkenyl group having a number of carbon atoms of 2 to 6 such as 1-propenyl group, 2-propenyl group, 2-methyl-1-propenyl group, 2-methyl-2-propenyl group, 1-butenyl group, 2-butenyl group, and 3-butenyl group; aryl group having a number of carbon atoms of 6 to 18 such as phenyl group, naphthyl group, anthranyl group, and phenanthryl group; substituted or unsubstituted aralkyl group having a number of carbon atoms of 7 to 18 such as benzyl group, fluorobenzyl group, methoxybenzyl group, fenetyl group, styryl group, cinnamyl group, and ethoxybenzyl group; group having another aromatic ring such as aryloxyalkyl including, for example, phenoxymethyl group and phenoxyethyl group; alkylcarbonyl group having a number of carbon atoms of 2 to 6 such as ethylcarbonyl group, propylcarbonyl group, and butylcarbonyl group; alkoxycarbonyl group having a number of carbon atoms of 2 to 6 such as ethoxycarbonyl group, propoxycarbonyl group, and butoxycarbonyl group; and N-alkylcarbamoyl group having a number of carbon atoms of 2 to 6 such as ethylcarbamoyl group, propylcarbamoyl group, butylcarbamoyl group, and pentylcarbamoyl group.

The compound, which has two oxetane rings, includes, for example, compounds represented by the following general formula (3).

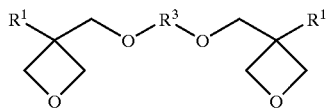
(3)

In the general formula (3), $R^1$ represents those as defined in the general formula (2) described above. $R^3$ represents, for example, linear or branched alkylene group usually having a number of carbon atom or carbon atoms of 1 to 20 such as ethylene group, propylene group, and butylene group; linear or branched poly(alkyleneoxy) group usually having a number of carbon atom or carbon atoms of 1 to 120 such as poly(ethyleneoxy) group and poly(propyleneoxy) group; linear or branched unsaturated hydrocarbon group such as propenylene group, methylpropenylene group, and butenylene group; carbonyl group; alkylene group containing carbonyl group; alkylene group containing carboxyl group at intermediate position of molecular chain; and alkylene group containing carbamoyl group at intermediate position of molecular chain. Alternatively, $R^3$ may be polyvalent group selected from groups represented by the following general formulas (4), (5), and (6).

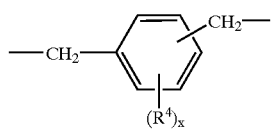
(4)

In the general formula (4), $R^4$ represents hydrogen atom; alkyl group having a number of carbon atom or carbon atoms of 1 to 4 such as methyl group, ethyl group, propyl group, and butyl group; alkoxy group having a number of carbon atom or carbon atoms of 1 to 4 such as methoxy group, ethoxy group, propoxy group, and butoxy group; halogen atom such as chlorine atom and boron atom; nitro group; cyano group; mercapto group; lower alkylcarboxyl group; carboxyl group; or carbamoyl group. x represents an integer of 1 to 4.

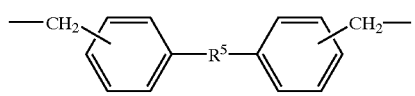
(5)

In the general formula (5), $R^5$ represents oxygen atom, sulfur atom, methylene group, —NH—, —SO—, —$SO_2$—, —$C(CF_3)_2$—, or —$C(CH_3)_2$—.

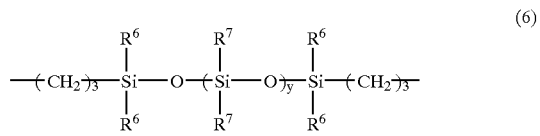
(6)

In the general formula (6), $R^6$ represents alkyl group having a number of carbon atom or carbon atoms of 1 to 4 such as methyl group, ethyl group, propyl group, and butyl group; or aryl group having a number of carbon atoms of 6 to 18 such as phenyl group and naphthyl group. y is an integer of 0 to 200. $R^7$ represents alkyl group having a number of carbon atom or carbon atoms of 1 to 4 such as methyl group, ethyl group, propyl group, and butyl group; or aryl group having a number of carbon atoms of 6 to 18 such as phenyl group and naphthyl group. $R^7$ may be a group represented by the following general formula (7).

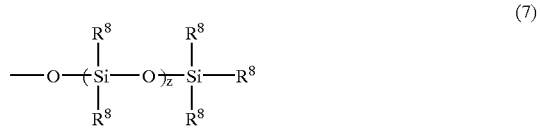
(7)

In the general formula (7), $R^8$ represents alkyl group having a number of carbon atom or carbon atoms of 1 to 4 such as methyl group, ethyl group, propyl group, and butyl group; or aryl group having a number of carbon atoms of 6 to 18 such as phenyl group and naphthyl group. z is an integer of 0 to 100.

Specifically, the compound, which has two oxetane rings, includes, for example, compounds represented by the following general formulas (8), (9), and (10).

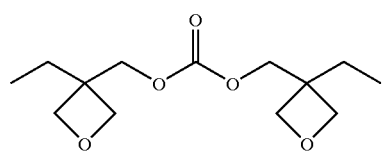
(8)

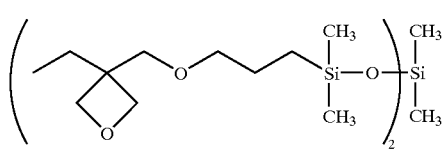
(9)

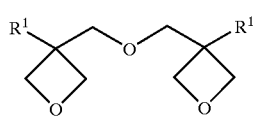
(10)

In the general formula (10), $R^1$ represents those as defined in the general formula (2) described above.

The compound, which has three or more oxetane rings, includes, for example, compounds represented by the following general formula (11).

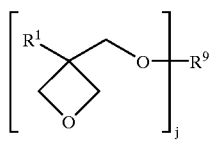
(11)

In the general formula (11), $R^1$ represents those as defined in the general formula (2) described above. $R^9$ represents trivalent to decavalent organic groups including, for example, branched or linear alkylene group having a number of carbon atom or carbon atoms of 1 to 30 such as groups represented by the following formulas (12) to (14), branched poly(alkyleneoxy) group such as groups represented by the following formula (15), and linear or branched polysiloxane-containing groups represented by the following formula (16) or (17). j represents an integer of 3 to 10 equal to the valency number of $R^9$.

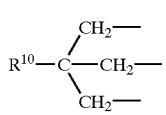
(12)

In the formula (12), $R^{10}$ represents alkyl group having a number of carbon atom or carbon atoms of 1 to 6 such as methyl group, ethyl group, and propyl group.

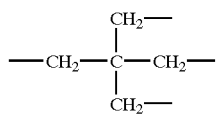
(13)

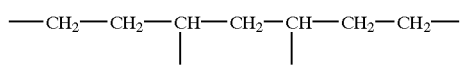
(14)

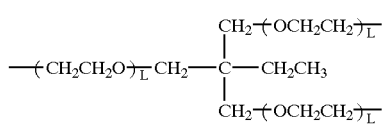
(15)

In the formula (15), L's are the same or different from each other, each of which is an integer of 1 to 10.

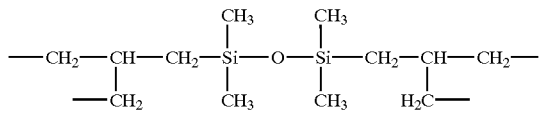
(16)

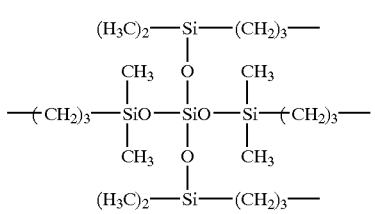
(17)

Specifically, the compound, which has four or more oxetane rings, includes, for example, a compound represented by the following formula (18).

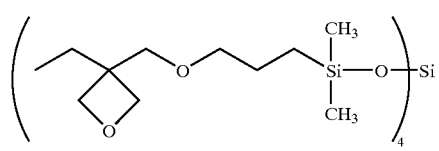
(18)

The compound represented by the following general formula (19) may have 1 to 10 oxetane ring or oxetane rings.

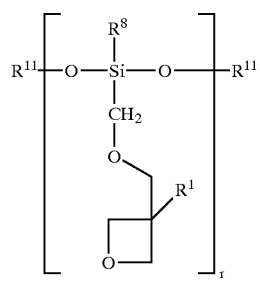
(19)

In the formula (19), $R^1$ represents those as defined in the general formula (2). $R^8$ represents those as defined in the general formula (7). $R^{11}$ represents alkyl group having a number of carbon atom or carbon atoms of 1 to 4 such as methyl group, ethyl group, propyl group, and butyl group; or trialkylsilyl group (in this case, alkyl groups are the same or different from each other, including those having a number of carbon atoms of 3 to 12 such as trimethylsilyl group, triethylsilyl group, tripropylsilyl group, and tributylsilyl group), and r represents an integer of 1 to 10.

Other than the examples described above, the compound (C) having the oxetane ring further includes compounds having a high molecular weight, i.e., a number average molecular weight of about 1000 to 5000 as converted into a value of polystyrene measured by the gel permeation chromatography. Such a compound includes compounds represented by the following formulas (20), (21), and (22) by of example.

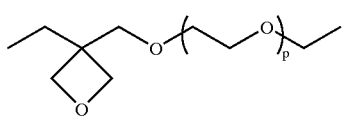
(20)

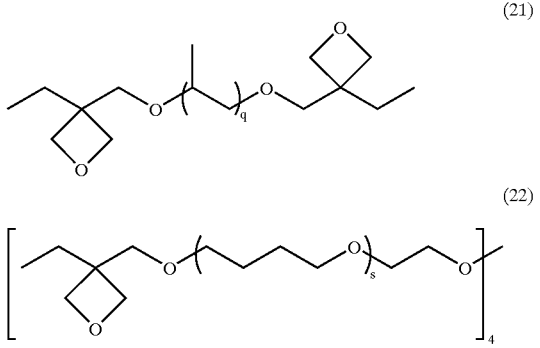

In the formula (20), p represents an arbitrary integer. In the formula (21), q represents an arbitrary integer. In the formula (22), s represents an integer of 20 to 200. Specified examples of the compound (C) having the oxetane ring or oxetane rings explained above are as follows.

Compound Having One Oxetane Ring

For example, there may be exemplified 3-ethyl-3-hydroxymethyloxetane, 3-(meta)allyloxymethyl-3-ethyloxetane, (3-ethyl-3-oxetanylmethoxy)methylbenzene, 4-fluoro-[1-(3-ethyl-3-oxetanylmethoxy)methyl]benzene, 4-methoxy-[1-(3-ethyl-3-oxetanylmethoxy)methyl]benzene, [1-(3-ethyl-3-oxetanylmethoxy)ethyl]phenyl ether, isobutoxymethyl(3-ethyl-3-oxetanylmethyl)ether, isobornyloxyethyl(3-ethyl-3-oxetanylmethyl)ether, isobornyl(3-ethyl-3-oxetanylmethyl)ether, 2-ethylhexyl(3-ethyl-3-oxetanylmethyl)ether, ethyldiethylene glycol (3-ethyl-3-oxetanylmethyl)ether, dicyclopentadiene(3-ethyl-3-oxetanylmethyl) ether, dicyclopentenyloxyethyl(3-ethyl-3-oxetanylmethyl)ether, dicyclopentenyl(3-ethyl-3-oxetanylmethyl)ether, tetrahydrofurfuryl(3-ethyl-3-oxetanylmethyl)ether, tetrabromophenyl(3-ethyl-3-oxetanylmethyl)ether, 2-tetrabromophenoxyethyl(3-ethyl-3-oxetanylmethyl)ether, tribromophenyl(3-ethyl-3-oxetanylmethyl)ether, 2-tribromophenoxyethyl(3-ethyl-3-oxetanylmethyl)ether, 2-hydroxyethyl(3-ethyl-3-oxetanylmethyl)ether, 2-hydroxypropyl(3-ethyl-3-oxetanylmethyl)ether, butoxyethyl(3-ethyl-3-oxetanylmethyl)ether, pentachlorophenyl(3-ethyl-3-oxetanylmethyl)ether, pentabromophenyl(3-ethyl-3-oxetanylmethyl)ether, and bornyl(3-ethyl-3-oxetanylmethyl) ether.

Compound Having Two or More Oxetane Rings

For example, there may be exemplified 3,7-bis(3-oxetanyl)-5-oxa-nonane, 3,3'-(1,3-(2-methylenyl)propanediylbis(oxymethylene))bis-(3-ethyloxetane), 1,4-bis[(3-ethyl-3-oxetanylmethoxy)methyl]benzene, 1,2-bis[(3-ethyl-3-oxetanylmethoxy)methyl]ethane, 1,3-bis[(3-ethyl-3-oxetanylmethoxy)methyl]propane, ethylene glycol bis(3-ethyl-3-oxetanylmethyl)ether, dicyclopentenylbis(3-ethyl-3-oxetanylmethyl)ether, triethylene glycol bis(3-ethyl-3-oxetanylmethyl)ether, tetraethylene glycol bis(3-ethyl-3-oxetanylmethyl)ether trimethylolpropane tris(3-ethyl-3-oxetanylmethyl)ether, 1,4-bis(3-ethyl-3-oxetanylmethoxy)butane, 1,6-bis(3-ethyl-3-oxetanylmethoxy)hexane, pentaerythritol tris(3-ethyl-3-oxetanylmethyl)ether, pentaerythritol tetrakis(3-ethyl-3-oxetanylmethyl)ether, polyethylene glycol bis(3-ethyl-3-oxetanylmethyl)ether, dipentaerythritol hexakis(3-ethyl-3-oxetanylmethyl)ether, dipentaerythritol pentakis(3-ethyl-3-oxetanylmethyl)ether, dipentaerythritol tetrakis(3-ethyl-3-oxetanylmethyl)ether, caprolactone modified dipentaerythritol hexakis(3-ethyl-3-oxetanylmethyl)ether, caprolactone modified dipentaerythritol pentakis(3-ethyl-3-oxetanylmethyl) ether, ditrimethylolpropane tetrakis(3-ethyl-3-oxetanylmethyl)ether, EO modified bisphenol A bis(3-ethyl-3-oxetanylmethyl)ether, PO modified bisphenol A bis(3-ethyl-3-oxetanylmethyl) ether, EO modified hydrogenated bisphenol A bis(3-ethyl-3-oxetanylmethyl)ether, PO modified hydrogenated bisphenol A bis(3-ethyl-3-oxetanylmethyl)ether, and EO modified bisphenol F (3-ethyl-3-oxetanylmethyl)ether. One species of the compound as described above may be used singly. Alternatively, two or more species of the compounds as described above may be used in combination.

Among them, the compound having the oxetane ring, which may be used especially preferably as the component (C) of the resin composition of the present invention, includes, for example, (3-ethyl-3-oxetanylmethoxy)methylbenzene represented by the following formula (23), 1,4-bis[(3-ethyl-3-oxetanylmethoxy)methyl]benzene represented by the formula (24), 1,2-bis(3-ethyl-3-oxetanylmethoxy)ethane represented by the formula (25), trimethylolpropane tris(3-ethyl-3-oxetanylmethyl)ether represented by the formula (26), and the compounds represented by the general formula (19) described above.

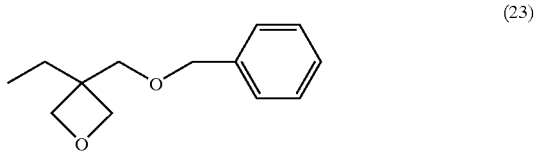

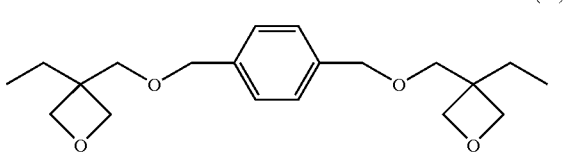

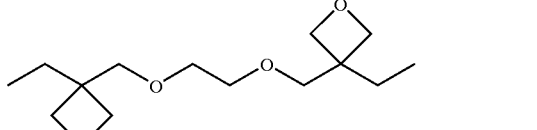

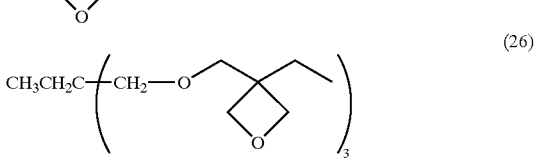

One species of the compound having the oxetane ring as described above may be used singly. Alternatively, two or more species of the compounds having the oxetane ring as described above may be used in combination.

Especially, it is desirable to use 3-ethyl-3-hydroxymethyloxetane, di[1-ethyl(3-oxetanyl)]methyl ether, or 3-ethyl-3-(2-ethylhexyloxymethyl)oxetane. When 3-ethyl-3-hydroxymethyloxetane, di[1-ethyl(3-oxetanyl)]methyl ether, or 3-ethyl-3-(2-ethylhexyloxymethyl)oxetane is used, then the reaction velocity of the photo-cationic polymerization is quickened in the present invention, and it is possible to quickly obtain the active energy beam-curable composition of the present invention.

The content of the oxetane compound in the composition is preferably about 2% by weight to about 87% by weight in order to avoid the occurrence of the odor and the cloudiness. Further, when the composition is used for an ink head of an ink-jet apparatus (or ink discharging apparatus) which performs ink-molding or ink-curing printing, the content of the oxetane compound is preferably about 20% by weight to about 77% by weight. When the composition is used for the ink preferably usable for the ink-jet application, the content of the oxetane compound affects the viscosity of the composition. Therefore, it is preferable to adjust the content within a range in which the viscosity of the composition upon discharging the ink from an ink jet head is 2 cps to 30 cps. The oxetane compound is disclosed in detail in U.S. Pat. No. 5,463,084, the content of which has been incorporated herein by reference.

(D) Other Components

In addition to the essential components described above, the active energy beam-curable composition of the present invention may be optionally blended with inactive components such as an inorganic filler, a dye, a pigment, a viscosity-adjusting agent, a treating agent, and an ultraviolet radiation-blocking agent. Further, if necessary, it is possible to blend a component capable of radical polymerization with the active energy beam, such as a radical photopolymerization initiator and a compound having (meth)acryloyl group.

When the active energy beam-curable composition of the present invention is cured with ultraviolet radiation, a photosensitizing agent may be blended in order to further improve the curing performance. Typical sensitizing agents, which are usable in the present invention, include compounds disclosed by "Crivello" in Adv. in Polymer Sci., 62, 1 (1984). Specifically, the sensitizing agent includes, for example, pyrene, perylene, acridine orange, thioxanthone, 2-chlorothioxanthone, and benzoflavin. When the active energy beam-curable composition of the present invention is used as an ink for ink-jet printing, the active energy beam-curable composition may contain, for example, a coloring agent such as a synthetic dye or a pigment, an inorganic filler, a surface-treating agent (a surfactant and/or a dispersing agent), a viscosity-adjusting agent, a treating agent, and an ultraviolet radiation-blocking agent, in addition to the photo-cationic polymerizable substance, the photo-cationic polymerization initiator, and the oxetane compound. When the composition is used as an ink for ink-jet application, the composition is prepared so that the viscosity of the composition upon discharging the ink from an ink jet head is 2 cps to 30 cps. U.S. Pat. No. 5,059,266 discloses, for example, additives, contents thereof, and characteristics of the ink when the active energy beam-curable composition is used as an ink for ink-jet printing. The disclosure of this United States Patent has been incorporated herein by reference. The active energy beam, which is used to cure the composition of the present invention, includes, ultraviolet radiation, infrared radiation, and electron beam (EB).

Next, explanation will be made for inks (active energy beam-curable compositions) obtained in Examples and Comparative Examples.

COMPARATIVE EXAMPLE 1

A transparent liquid composition was obtained by mixing and agitating, at room temperature in a dark room, a photo-cationic polymerizable substance, i.e., 30 parts by weight of 3,4-epoxycyclohexylmethyl-3',4'-epoxycyclohexane carboxylate (trade name: UVR-6110, produced by Union Carbide Corporation), 30 parts by weight of limonene dioxide (produced by elf atochem), 40 parts by weight of triethylene glycol divinyl ether (trade name: DVE-3, produced by ISP), and a photo-cationic polymerization initiator, i.e., 4 parts by weight of a mixture of triarylsulfonium hexafluorophosphate salts and propylene carbonate (trade name: UVI-6990, produced by Union Carbide Corporation, active ingredient: 50%).

COMPARATIVE EXAMPLE 2

A transparent liquid composition was obtained in the same manner as in Comparative Example 1 except that a photo-cationic polymerizable substance, i.e., 5 parts by weight of 3,4-epoxycyclohexylmethyl-3',4'-epoxycyclohexane carboxylate (trade name: UVR-6110, produced by Union Carbide Corporation), 95 parts by weight of di[1-ethyl(3-oxetanyl)]methyl ether (trade name: OXT-221, produced by Toagosei Co., Ltd.), and a photo-cationic polymerization initiator, i.e., 4 parts by weight of a mixture of triarylsulfonium hexafluorophosphate salts and propylene carbonate (trade name: UVI-6990, produced by Union Carbide Corporation, active ingredient: 50%) were used.

EXAMPLE 1

A transparent liquid composition was obtained in the same manner as in Comparative Example 1 except that a photo-cationic polymerizable substance, i.e., 30 parts by weight of 3,4-epoxycyclohexylmethyl-3',4'-epoxycyclohexane carboxylate (trade name: UVR-6110, produced by Union Carbide Corporation), 30 parts by weight of limonene dioxide (produced by elf atochem), 40 parts by weight of 3-ethyl-3-hydroxymethyloxetane (trade name: OXT-101, produced by Toagosei Co., Ltd.), and a photo-cationic polymerization initiator, i.e., 4 parts by weight of a mixture of triarylsulfonium hexafluorophosphate salts and propylene carbonate (trade name: UVI-6990, produced by Union Carbide Corporation, active ingredient: 50%) were used.

EXAMPLE 2

A transparent liquid composition was obtained in the same manner as in Comparative Example 1 except that a photo-cationic polymerizable substance, i.e., 30 parts by weight of 3,4-epoxycyclohexylmethyl-3',4'-epoxycyclohexane carboxylate (trade name: UVR-6110, produced by Union Carbide Corporation), 30 parts by weight of limonene dioxide (produced by elf atochem), 40 parts by weight of 1,4-bis{[(3-ethyl-3-oxetanyl)methoxy]methyl}benzene (trade name: OXT-121, produced by Toagosei Co., Ltd.), and a photo-cationic polymerization initiator, i.e., 4 parts by weight of a mixture of triarylsulfonium hexafluorophosphate salts and propylene carbonate (trade name: UVI-6990, produced by Union Carbide Corporation, active ingredient: 50%) were used.

EXAMPLE 3

A transparent liquid composition was obtained in the same manner as in Comparative Example 1 except that a photo-cationic polymerizable substance, i.e., 30 parts by weight of 3,4-epoxycyclohexylmethyl-3',4'-epoxycyclohexane carboxylate (trade name: UVR-6110, produced by Union Carbide Corporation), 30 parts by weight of limonene dioxide (produced by elf atochem), 40 parts by weight of 3-ethyl-3-(phenoxymethyl)oxetane (trade name: OXT-211, produced by Toagosei Co., Ltd.), and a photo-cationic polymerization initiator, i.e., 4 parts by weight of a mixture of triarylsulfonium hexafluorophosphate salts and propylene carbonate (trade name: UVI-6990, produced by Union Carbide Corporation, active ingredient: 50%) were used.

EXAMPLE 4

A transparent liquid composition was obtained in the same manner as in Comparative Example 1 except that a photo-cationic polymerizable substance, i.e., 30 parts by weight of 3,4-epoxycyclohexylmethyl-3',4'-epoxycyclohexane carboxylate (trade name: UVR-6110, produced by Union Carbide Corporation), 30 parts by weight of limonene dioxide (produced by elf atochem), 40 parts by weight of di[1-ethyl(3-oxetanyl)]methyl ether (trade name: OXT-221, produced by Toagosei Co., Ltd.), and a photo-cationic polymerization initiator, i.e., 4 parts by weight of a mixture of triarylsulfonium hexafluorophosphate salts and propylene carbonate (trade name: UVI-6990, produced by Union Carbide Corporation, active ingredient: 50%) were used.

EXAMPLE 5

A transparent liquid composition was obtained in the same manner as in Comparative Example 1 except that a photo-cationic polymerizable substance, i.e., 30 parts by weight of 3,4-epoxycyclohexylmethyl-3',4'-epoxycyclohexane carboxylate (trade name: UVR-6110, produced by Union Carbide Corporation), 30 parts by weight of limonene dioxide (produced by elf atochem), 40 parts by weight of 3-ethyl-3-(2-ethylhexyloxymethyl) oxetane (trade name: OXT-212, produced by Toagosei Co., Ltd.), and a photo-cationic polymerization initiator, i.e., 4 parts by weight of a mixture of triarylsulfonium hexafluorophosphate salts and propylene carbonate (trade name: UVI-6990, produced by Union Carbide Corporation, active ingredient: 50%) were used.

EXAMPLE 6

A transparent liquid composition was obtained in the same manner as in Comparative Example 1 except that a photo-cationic polymerizable substance, i.e., 30 parts by weight of 3,4-epoxycyclohexylmethyl-3',4'-epoxycyclohexane carboxylate (trade name: UVR-6110, produced by Union Carbide Corporation), 30 parts by weight of limonene dioxide (produced by elf atochem), 40 parts by weight of 3-ethyl-3-{[3-(triethoxysilyl)propoxy]methyl}oxetane (trade name: OXT-610, produced by Toagosei Co., Ltd.), and a photo-cationic polymerization initiator, i.e., 4 parts by weight of a mixture of triarylsulfonium hexafluorophosphate salts and propylene carbonate (trade name: UVI-6990, produced by Union Carbide Corporation, active ingredient: 50%) were used.

EXAMPLE 7

A transparent liquid composition was obtained in the same manner as in Comparative Example 1 except that a photo-cationic polymerizable substance, i.e., 10 parts by weight of 3,4-epoxycyclohexylmethyl-3',4'-epoxycyclohexane carboxylate (trade name: UVR-6110, produced by Union Carbide Corporation), 88 parts by weight of limonene dioxide (produced by elf atochem), 2 parts by weight of oxetanyl silsesqui-oxane (code: OX-SQ, produced by Toagosei Co., Ltd.), and a photo-cationic polymerization initiator, i.e., 4 parts by weight of a mixture of triarylsulfonium hexafluorophosphate salts and propylene carbonate (trade name: UVI-6990, produced by Union Carbide Corporation, active ingredient: 50%) were used.

EXAMPLE 8

A transparent liquid composition was obtained in the same manner as in Comparative Example 1 except that a photo-cationic polymerizable substance, i.e., 10 parts by weight of 3,4-epoxycyclohexylmethyl-3',4'-epoxycyclohexane carboxylate (trade name: UVR-6110, produced by Union Carbide Corporation), 88 parts by weight of limonene dioxide (produced by elf atochem), 2 parts by weight of phenol novolac oxetane (code: PNOX-1009, produced by Toagosei Co., Ltd.), and a photo-cationic polymerization initiator, i.e., 4 parts by weight of a mixture of triarylsulfonium hexafluorophosphate salts and propylene carbonate (trade name: UVI-6990, produced by Union Carbide Corporation, active ingredient: 50%) were used.

EXAMPLE 9

A transparent liquid composition was obtained in the same manner as in Comparative Example 1 except that a photo-cationic polymerizable substance, i.e., 10 parts by weight of 3,4-epoxycyclohexylmethyl-3',4'-epoxycyclohexane carboxylate (trade name: UVR-6110, produced by Union Carbide Corporation), 90 parts by weight of di[1-ethyl(3-oxetanyl)]methyl ether (trade name: OXT-221, produced by Toagosei Co., Ltd.), and a photo-cationic polymerization initiator, i.e., 4 parts by weight of a mixture of triarylsulfonium hexafluorophosphate salts and propylene carbonate (trade name: UVI-6990, produced by Union Carbide Corporation, active ingredient: 50%) were used.

EXAMPLE 10

A transparent liquid composition was obtained in the same manner as in Comparative Example 1 except that a photo-cationic polymerizable substance, i.e., 10 parts by weight of 3,4-epoxycyclohexylmethyl-3',4'-epoxycyclohexane carboxylate (trade name: UVR-6110, produced by Union Carbide Corporation), 20 parts by weight of limonene dioxide (produced by elf atochem), 70 parts by weight of di[1-ethyl(3-oxetanyl)]methyl ether (trade name: OXT-221, produced by Toagosei Co., Ltd.), and a photo-cationic polymerization initiator, i.e., 4 parts by weight of a mixture of triarylsulfonium hexafluorophosphate salts and propylene carbonate (trade name: UVI-6990, produced by Union Carbide Corporation, active ingredient: 50%) were used.

EXAMPLE 11

A transparent liquid composition was obtained in the same manner as in Comparative Example 1 except that a photo-cationic polymerizable substance, i.e., 10 parts by weight of 3,4-epoxycyclohexylmethyl-3',4'-epoxycyclohexane carboxylate (trade name: UVR-6110, produced by Union Carbide Corporation), 88 parts by weight of limonene dioxide (produced by elf atochem), 2 parts by weight of di[1-ethyl(3-oxetanyl)]methyl ether (trade name: OXT-221, produced by Toagosei Co., Ltd.), and a photo-cationic polymerization initiator, i.e., 4 parts by weight of a mixture of triarylsulfonium hexafluorophosphate salts and propylene carbonate (trade name: UVI-6990, produced by Union Carbide Corporation, active ingredient: 50%) were used.

I. Curing Method

The obtained composition was applied to a polyester film so that the thickness was about 15 $\mu$m, and then the composition was cured by allowing the composition to pass through twice an ultraviolet radiation-irradiating apparatus of the conveyer type, the apparatus being installed with a super high voltage mercury lamp of 80 W/cm (lamp height: 155 mm, conveyer speed: 7.5 m/min., radiation intensity: 80 mW/cm$^2$, 160 mJ/cm$^2$). Test machine was Eye Mini Grandage ECS-151U (lamp output: 1.0 kW, belt conveyer type, produced by Eye Graphics Co., Ltd.).

II. Cloudiness Test

A test piece (cured composition) was placed on a hot plate heated to 110° C., and the test piece was covered with a glass vessel arranged thereon. The cloudiness in the glass vessel, which possibly appeared after being left to stand for 24 hours, was visually confirmed. The case with no cloudiness is indicated by "+", and the case with any cloudiness was indicated by "−".

The transparent liquid compositions (active energy beam-curable compositions) obtained in Examples 1 to 11 and Comparative Examples 1 and 2 described above were cured to perform the cloudiness test. Obtained results are summarized in Table 1 below. The photo-cationic polymerization initiators (components (B)) used for the respective compositions are entered in Table 1.

TABLE 1

|  | Component (C) | Cloudiness test (110° C. × 24 H) |
|---|---|---|
| Comparative Example 1 | DVE-3Tech | − |
| Comparative Example 2 | OXT-221 | − |
| Example 1 | OXT-101 | + |
| Example 2 | OXT-121 | + |
| Example 3 | OXT-211 | + |
| Example 4 | OXT-221 | + |
| Example 5 | OXT-212 | + |
| Example 6 | OXT-610 | + |
| Example 7 | OX-SQ | + |
| Example 8 | PNOX-1009 | + |
| Example 9 | OXT-221 | + |
| Example 10 | OXT-221 | + |
| Example 11 | OXT-221 | + |

According to Table 1, it has been confirmed that no cloudiness appears in the cloudiness test by further containing the oxetane compound.

The liquid compositions obtained in Examples 1 to 11 were used as transparent inks to perform the printing by using a printer which will be explained later. As a result, good output results were successfully obtained, in which neither odor nor cloudiness appeared. On the other hand, the liquid compositions obtained in Comparative Examples 1 and 2 were used as inks to perform the printing by using a printer. As a result, both of odor and cloudiness were confirmed.

An embodiment of an ink jet printer as an ink discharging apparatus in accordance with the invention will be described as below with reference to the accompanying drawings.

Figure 1B:
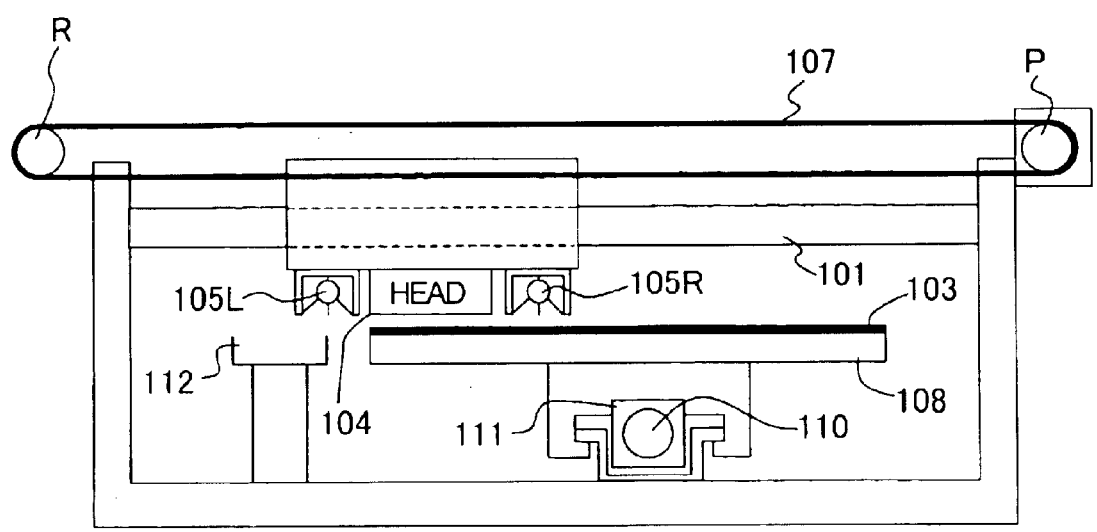
FIG. 1B is a front view of the color ink jet printer of the first embodiment.

Embodiments of the invention will be described with reference to the accompanying drawings. As shown in FIG. 1, a color ink jet printer 100 of a first embodiment includes a carriage 102 that can move in a main scanning direction (an X-axis direction) while guided by X-axis guide bars 101, 101 fixed to a frame F. A print head 104 as an ink discharging head and ultraviolet (UV) lamps 105L, 105R are provided on the carriage 102. The print head 104 includes a Y head 104Y for yellow (Y) ink, an M head 104M for magenta (M) ink, a C head 104C for cyan (C) ink and a K head 104K for black (K) ink. The ink to be ejected from the heads 104Y, 104M, 104C, 104K is an ultraviolet curing type ink (UV ink). The ink can be prepared by adding a coloring agent to the transparent liquid compositions prepared in the above examples. The heads 104Y, 104M, 104C and 104K are aligned in a sub scanning direction (a Y-axis direction), which is perpendicular to the main scanning direction, on the carriage 102. The UV lamps 105L, 105R are provided on right and left sides of the print head 104 so as to sandwich the print head 104 therebetween.

The UV lamps 105L, 105R irradiate the UV ink, ejected from the respective ink heads onto a recording medium 103, with ultraviolet light to increase its viscosity to cure the ink.

Each of the heads 104Y, 104M, 104C, 104K is formed with a plurality of nozzles, which face a platen 108 (described later) and are basically aligned in parallel to the sub scanning direction. The Y head 104Y, the M head 104M, the C head 104C and the K head 104K are connected with an yellow ink tank 104Y1 containing UV yellow ink, a magenta ink tank 104M1 containing UV magenta ink, a cyan ink tank 104C1 containing UV cyan ink, a black ink tank 104K1 containing UV black ink, respectively. Each UV ink is supplied from the respective ink tanks 104Y1, 104M1, 104C1, 104K1 to the respective nozzles through each ink flow path in the respective heads 104Y, 104M, 104C, 104K. Therefore, when one-line printing is performed by ejecting ink droplets of the UV ink from each head 104Y, 104M, 104C, 104K while the carriage 102 is moved in the main scanning direction, a printed portion is formed on the recording medium 103. A width of the printed portion is equal to a carriage traveling distance in the main scanning direction. A length of the printed portion is equal to a width of ink ejection from each head (a width of ink ejection from the nozzles in each head at a time).

An X-axis motor 106 that moves the carriage 102 in the sub scanning direction is attached to one of side walls the frame F. A driven pulley R is rotatably provided to the other side wall of the frame F. A timing belt 107 is stretched between the driven pulley R and a drive pulley P fixed to an output shaft of the X-axis motor 106. The timing belt 107 is engaged with the carriage 102. Thus, as the X-axis motor 106 is driven, the carriage 102 travels from side to side along the X-axis guide bars 101, 101, that is, the X-axis guide bars 101, 101 and the X-axis motor 106 moves the carriage 102 in the main scanning direction with respect to the recording medium 103. The platen 108 is supported by the frame F, under the carriage 102 and the X-axis guide bars 101, 101 so as to be movable in the sub scanning direction perpendicular to the main scanning direction. The platen 108 is formed with a plurality of air-intakes at its top, and a recording medium 103, such as a plastic plate, is placed on the top. Air is taken in from the air-intakes with the recording medium 103 placed on the top (a surface for placing the recording medium 103), so that a negative pressure is generated and thus the recording medium 103 is statically held on the platen 108. As described above, the platen 108 is provided with an air taking mechanism for holding the recording medium 103. The air taking mechanism also functions as a holding device for holding the recording medium 103. The holding device is not limited to the air taking mechanism. However, various types of holding devices can be adopted. For example, a clamp mechanism that mechanically presses and holds the recording medium 103 on the platen 108 can be adopted.

A screw shaft 110, extending in a direction perpendicular to the main scanning direction, is rotatably supported by the frame F. One end of the screw shaft 110 is secured to an output shaft of a Y-axis motor 109. A bearing 111, into which the screw shaft 110 is threaded, is fixed under the platen 108. As the screw shaft 110 is rotated by the Y-axis motor 109, the platen 108 is moved in the sub scanning direction. A screw mechanism having the screw shaft 110, the bearing 111 and the Y-axis motor 109 moves the platen 108 in the sub scanning direction with respect to the carriage 102.

The amount and direction of travel of the carriage 102 is controlled by controlling the amount and direction of rotation of the X-axis motor 106. For example, a pulse motor is preferably used as the X-axis motor 106. The amount and direction of travel of the platen 108 is controlled by controlling the amount and direction of rotation of the Y-axis motor 109. For example, a pulse motor is preferably used as the Y-axis motor 109.

An area 112 is a maintenance area in which purging, wiping, flushing and the like are performed. As shown in FIG. 1A, the UV lamps 105L, 105R are longer than the print head 104 in a direction of feeding the recording medium 103 by a predetermined length.

Figure 2:
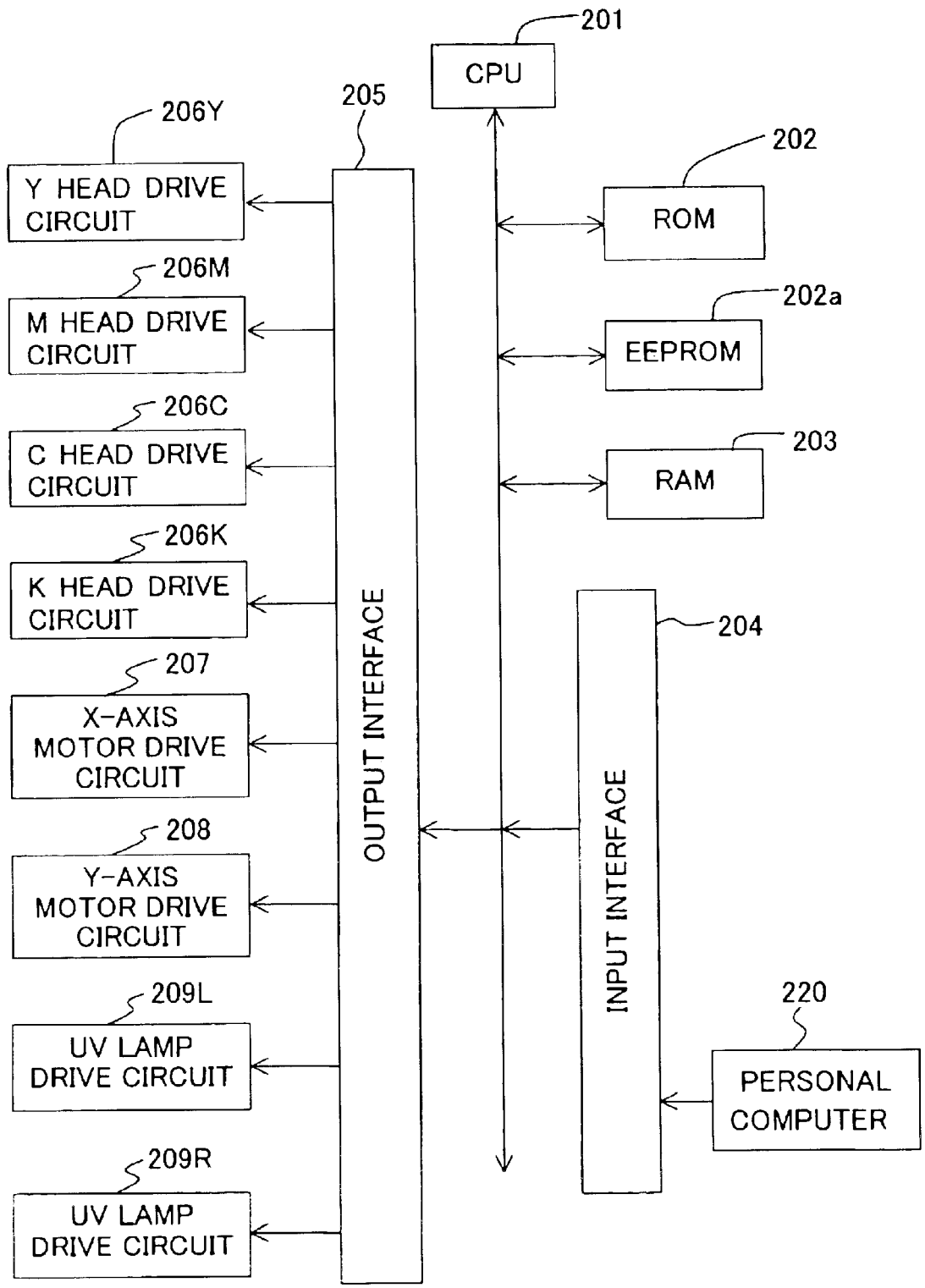
FIG. 2 is a schematic block diagram showing a control system of the ink jet printer of the first embodiment.

As shown in FIG. 2, a control system of the color ink jet printer 100 includes a CPU 201, a ROM 202, an EEPROM 202a, a RAM 203, an input interface 204 and an output interface 205. The output interface 205 is connected with a Y head drive circuit 206Y, an M head drive circuit 206M, a C head drive circuit 206C, a K head drive circuit 206K, an X-axis motor drive circuit 207, a Y-axis motor drive circuit 208 and UV lamp drive circuits 209L, 209R. A control signal and data from a personal computer 220 are inputted to the input interface 204.

Figure 3:
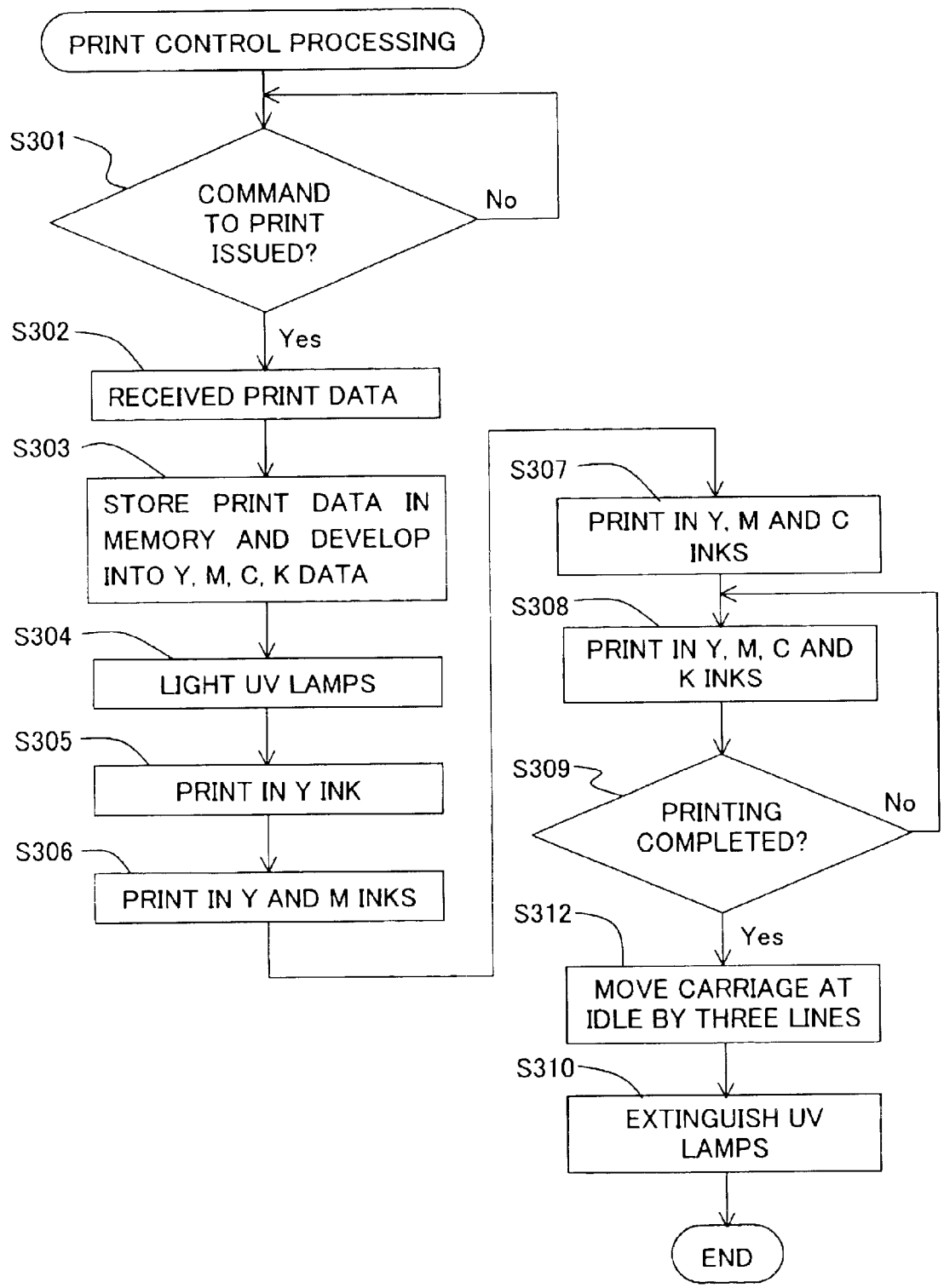
FIG. 3 is a flowchart of control processing to be executed in the ink jet printer of an embodiment.

FIG. 3 is a flowchart for performing print control processing. At first, the CPU 201 determines whether a command to start printing has been issued from the personal computer 220 (S301). When the CPU 201 determines that the command to start printing has been issued (S301: YES), the CPU 201 receives print data (S302). After the CPU 201 receives a page of print data, the CPU 201 stores the print data in the RAM 203 and develops the print data into one page of data of each color of Y, M, C, K (S303). Then, the CPU 201 lights the UV lamps 105L, 105R (S304). After that, based on the Y data, while outputting one line of dot data to the Y head drive circuit 206Y, the CPU 201 performs one-line printing in the UV yellow ink by moving the carriage 102 in the main scanning direction (S305).

One-line printing is performed as described below. A print data developing area for one page is provided according to color in the RAM 203. One page of dot data is developed into each print data developing area in the bitmap format in which dots are aligned in the main scanning direction and in the sub scanning direction. Each dot in the dot data represents ejection (nonejection) of an ink droplet from one nozzle. One-line printing of dot data is that dots equal to the number of nozzles aligned in the sub scanning direction are selected in the sub scanning direction and rows of the selected dots are aligned in the main scanning direction from a print start side to a print end side. Dots equal to the number of nozzles aligned in the sub scanning direction are selected and referred to as dot rows. While the dot rows are sequentially read from the print data developing area from the print start side to the print end side and supplied to each heads 104Y, 104M, 104C, 104K, the print head 104 is moved in the main scanning direction, thereby one line of a printed portion is formed on a recording medium 103. Upon performing the printing, a printed portion is irradiated with ultraviolet light by the UV lamps 105L, 105R disposed adjacent to the print head 104 to increase its viscosity.

Next, the CPU 201 moves the platen 108 in the sub scanning direction by one line (by the width of the ink ejection from the print head 104). Then, while outputting each one line of the dot data to the respective Y and M head drive circuits 206Y and 206M based on each Y and M data, respectively, the CPU 201 performs one-line printing in each of the UV yellow ink and the UV magenta ink by moving the carriage 102 in the main scanning direction (S306).

That is, at S305, one-line printing of the first line of the Y data has been performed. Therefore, next, dot data of the Y data for a second line is selected and provided to the Y head drive circuit 206Y and dot data of the M data for a first line is selected and provided to the M head drive circuit 206M. In other words, ink droplets of the UV magenta ink to be ejected according to the M data are ejected on the first line of the UV yellow ink ejected at S305. However, the viscosity of the UV yellow ink ejected prior to the ejection of the UV magenta ink has already been increased by the irradiation by the UV lamps 105L, 105R, so that the UV yellow ink and the UV magenta ink do not intermix and clarity of the ink colors is not degraded. Upon performing the printing in each of the UV yellow ink and the UV magenta ink, the UV yellow ink and the UV magenta ink ejected at S306 are irradiated with ultraviolet light by the UV lamps 105L, 105R to increase their viscosity.

Next, the CPU 201 moves the platen 108 in the sub scanning direction by one line. Then, while outputting each one line of the dot data to the respective Y, M and C head drive circuits 206Y, 206M and 206C based on each Y, M and C data, respectively, the CPU 201 performs one-line printing in each of the UV yellow ink, the UV magenta ink and the UV cyan ink by moving the carriage 102 in the main scanning direction (S307).

That is, dot data of the Y data for a third line, dot data of the M data for a second line and dot data of the C data for a first line are selected and supplied to the Y head drive circuit 206Y, the M head drive circuit 206M and the C head drive circuit 206C, respectively. In other words, ink droplets of the UV cyan ink to be ejected according to the C data are ejected on the first line of the UV magenta ink ejected at S306. However, the viscosity of the UV magenta ink has already been increased by the irradiation by the UV lamps 105L, 105R, so that the UV magenta ink and the UV cyan ink do not intermix and clarity of the ink colors is not degraded. In short, the first line of the UV magenta ink is ejected over the first line of the UV yellow ink, and the first line of the UV cyan ink is ejected over the first line of the UV magenta ink. One-line printing according to the M and Y data is also performed in the same manner described above.

Next, the CPU 201 moves the platen 108 in the sub scanning direction by one line. Then, while outputting each one line of the dot data to the respective Y, M, C and K head drive circuits 206Y, 206M, 206C and 206K based on each Y, M, C and K data, respectively, the CPU 201 performs one-line printing in each of the UV yellow ink, the UV magenta ink, the UV cyan ink and the UV black ink by moving the carriage 102 in the main scanning direction. (S308).

That is, dot data of the Y data for a fourth line, dot data of the M data for a third line, dot data of the C data for a second line and dot data of the K data for a first line are selected and supplied to the Y head drive circuit 206Y, the M head drive circuit 206M, the C head drive circuit 206C and the K head drive circuit 206K, respectively. At S308, if the K data to be read is dot data for a Nth line (N is a whole number), the Y dot data is dot date for N+3th line, the M data is dot data for N+2th line and the C data is dot data for N+1th line. If the CPU 201 makes a determination in the negative at S309 described later, the CPU 201 sequentially increments N and reads dot data. The ejected ink droplets are irradiated with the ultraviolet light to increase their viscosity immediately after the ink droplets are ejected.

Then, the CPU 201 determines whether all printing has completed (S309). If the printing has not completed yet (S309: NO), dot data of each of the Y, M, C and K data for a next line is read and printing is performed according to the data at S308 until the printing is completed.

The repetition of the one-line printing and the transport of the platen 108 will make the printing operation reach a last line in order of the Y head 104Y, the M head 104M, the C head 104C and the K head 104K. When dot data that is to be used for printing is not left as to all the heads 104Y, 104M, 104C, 104K, the CPU 201 determines that the printing has completed. At S308, dot data of each color is read. At that time, if dot data of each color has already been used for printing in a last line, the CPU 201 outputs dot data that means nonejection of ink as to the dot data of each color.

When the CPU 201 determines that the printing has completed (S309: YES), the CPU 201 moves the carriage 102 at idle by three lines without ejecting ink droplets from the heads 104Y, 104M, 104C, 104K (S312). The UV black ink ejected last is irradiated with the ultraviolet light for the time of the one-line printing at the moment. That is, the irradiation time of the ultraviolet light to the last printed portion in the UV black ink is shorter than that to the other printed portion, so that the carriage 102 is moved at idle to irradiate the ultraviolet light to cover a shortfall. That is, the UV yellow ink is irradiated with ultraviolet light three times before the UV black ink is ejected, the UV magenta ink is irradiated twice before the UV black ink is ejected, and the UV cyan ink is irradiated once before the UV black ink is ejected. Therefore, if the irradiation of the ultraviolet light is finished when the ejection of the UV black ink in the last line is completed, the irradiation amount of the ultraviolet light to the area of three lines from the last printed line is less than that to the other portions. Due to lack of the irradiation, the viscosity of the UV black ink ejected in the last line may not be sufficiently increased or the ink may not be sufficiently cured. To avoid this, the carriage 102 is moved at idle the number of times that is one less than the number of heads to average the time of the irradiation of the ultraviolet light. By doing so, the inks ejected onto the recording medium 103 are equally cured. After that, the CPU 201 extinguishes the UV lamps 105L, 105R (S310), and thus this processing has completed.

According to the color ink jet printer 100 of the first embodiment, the UV lamps 105L, 105R are mounted on the carriage 102 to be placed front and/or behind of the heads 104Y, 104M, 104C, 104K in the main scanning direction. Thus, cure of ink can be performed in parallel with ink ejection from each heads 104Y, 104M, 104C, 104K. The color ink jet printer 100 does not become large in size, and the time required for printing can be shortened. Further, the colors of the printing can be clearly represented.

The UV lamps 105L, 105R are longer than the heads 104Y, 104M, 104C, 104K in the sub scanning direction, so that cure of ink can be performed with respect to all heads 104Y, 104M, 104C, 104K at a time in parallel with ink ejection from the heads 104Y, 104M, 104C, 104K. Further, the substantially same amount of energy can be irradiated to each color of ink on a recording medium 103, so that the ink can be evenly cured.

The active energy beam-curable composition of the present invention has been explained with reference to Examples. However, the present invention is not limited thereto. The active energy beam-curable composition can be constituted by using other components and compositions within appended claims. 3,4-Epoxycyclohexylmethyl-3',4'-epoxycyclohexane carboxylate has been used as the photo-cationic polymerizable substance. In place of this compound, it is possible to use a variety of photo-cationic polymerizable substances as described in the specification. The active energy beam-curable composition of the present invention can be applied to a variety of objectives. Even when the composition is heated after being cured, the occurrence of the odor and the cloudiness is suppressed.

What is claimed is:

1. An active energy beam-curable composition comprising:
   a photo-cationic polymerizable substance;
   a photo-cationic polymerization initiator;
   limonene dioxide: and
   an oxetane compound,
   wherein a weight ratio of a total weight of the limonene dioxide and the oxetane compound to a weight of the photo-cationic polymerizable substance is 7:3 to 9:1.

2. The composition according to claim 1, wherein the oxetane compound is selected from the group consisting of 3-ethyl-3-hydroxymethyloxetane, 1,4-bis {[(3-ethyl-3-oxetanyl)methoxy]methyl}benzene, di[1-ethyl(3-oxetanyl)] methyl ether, 3-ethyl-3-(2-ethylhexyloxymethyl)oxetane, 3-ethyl-3-(phenoxymethyl)oxetane, 3-ethyl-3-{[3-(triethoxysilyl)propoxy]methyl}oxetane, oxetanyl silsesquioxane, and phenol novolac oxetane.

3. The composition according to claim 1, wherein the oxetane compound is selected from the group consisting of 3-ethyl-3-hydroxymethyloxetane, di[1-ethyl(3-oxetanyl)] methyl ether, and 3-ethyl-3-(2-ethylhexyloxymethyl) oxetane.

4. The composition according to claim 1, wherein the photocation-polymerizable substance includes an epoxy resin compound.

5. The composition according to claim 3, wherein the epoxy resin compound is an alicyclic epoxy resin compound.

6. The composition according to claim 1, wherein the photo-cationic polymerization initiator contains an onum salt.

7. The composition according to claim 1, wherein the composition is an ink.

8. The composition according to claim 7, further comprising a coloring agent.

9. An ink discharging apparatus comprising:
   an ink discharging head which discharges an ink;
   an ink tank which stores the ink to be supplied to the ink discharging head; and
   a light source which is used to cure the discharged ink,
   wherein the ink comprises:
   a photo-cationic polymerizable substance;
   a photo-cationic polymerization initiator;
   limonene dioxide: and
   an oxetane compound,
   wherein a weight ratio of a total weight of the limonene dioxide and the oxetane compound to a weight of the photo-cationic polymerizable substance i 7:3 to 9:1.

10. The ink discharging apparatus according to claim 9, wherein the oxetane compound is selected from the group consisting of 3-ethyl-3-hydroxymethyloxetane, 1,4-bis{[(3-ethyl-3-oxetanyl)methoxy]methyl}benzene, di[1-ethyl(3-oxetanyl]methyl ether, 3-ethyl-3-(2-ethylhexyloxymethyl) oxetane, 3-ethyl-3-(phenoxymethyl)oxetane, 3-ethyl-3-{[3-(triethoxysilyl)propoxy]methyl}oxetane, oxetanyl silsesquioxane, and phenol novolac oxetane.

11. The ink discharging apparatus according to claim 9, wherein the oxetane compound is selected from the group consisting of 3-ethyl-3-hydroxymethyloxetane, di[1-ethyl (3-oxetanyl)]methyl ether, and 3-ethyl-3-(2-ethylhexyloxymethyl)oxane.

12. The ink discharging apparatus according to claim 9, wherein the photocation-polymerizable substance includes an epoxy resin compound.

13. The ink discharging apparatus according to claim 12, wherein the epoxy resin compound is an alicyclic epoxy resin compound.

14. The ink discharging apparatus according to claim 9, wherein the photo-cationic polymerization initiator contains an onium salt.

15. The ink discharging apparatus according to claim 9, wherein the ink contains a coloring agent.

* * * * *